Patented Oct. 24, 1939

2,177,568

UNITED STATES PATENT OFFICE 2,177,568

PAVING COMPOSITION

James M. Johnson, New York, N. Y.

No Drawing. Application May 6, 1937,
Serial No. 141,184

4 Claims. (Cl. 106—31)

This invention has utility in the application of asphalt, and like bituminous substances to surfaces on stone, brick, steel, glass, cement, and other substances when such substances are either wet or dry, and whether the bituminous substance functions merely as a coating, or as a cement to hold particles together, as in pavements or floors.

Bituminous materials, represented by the various asphalts, whether native, petroleum or coal tar, and bituminous substances in general, are widely used in the construction, and repair of pavements, floors and roofs as well as for coating various articles and for paints.

The ductility of asphalt is an important property in connection with its bonding to stone or aggregate. This can be generally increased by heating within certain limits of temperature or addition of solvents within certain limits. Emulsification reduces the viscosity without affecting the ductility. The wetting power of the asphalt against the aggregate is also a factor in determining the permanence of the finished product.

The great defect which is apparent for these purposes, even when treated as outlined above, is that it does not permanently adhere to surfaces of all materials, and not at all to the surfaces of any when these surfaces are wet.

The principal object of this invention is a preparation of bituminous material for use in pavement manufacture which spreads evenly over the aggregate, adheres permanently to the surfaces, even when they are wet, and cements it to a rigid, waterproof mass.

Another object of this invention is a preparation of said material which can be used as a paint on surfaces of wood, iron or steel, glass, slate, concrete, cement, or material having similar qualities of surfaces.

Another object of this invention is a composition of matter which will unite with said bituminous material to give it that degree of ductility which will enable it to throughout and over the surfaces of pavement aggregates, penetrate between the separate particles thereof, and adhere thereto, thus, even when the aggregate is wet, uniting the aggregate into a firm, solid and waterproof mass.

Another object is to prepare such a composition of matter as will when mixed with bituminous material, enable it to penetrate worn or broken surfaces of pavement and cement aggregate with which it has been mixed firmly thereto.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

In preparing the bituminous composition, I mix aluminum oleate with an excess of red oil. This product is then mixed with twice its weight of light lubricating oil, and heated to 150° Fahrenheit, to dissolve the soap.

98.5 parts of asphalt and 1.5 parts of this product are then mixed, heated and agitated to produce a homogeneous mixture.

The following examples, given only by way of illustration, will disclose the salient features of my invention.

Example I

A solution of hydrated aluminium sulfate was intimately mixed with twice its weight of red oil. The product of the resulting chemical reaction is aluminum oleate, mixed with free oleic acid, and this separates from the water, as a superposed layer.

This product, in turn, was mixed with two parts of light lubricating oil and heated to 150° Fahrenheit in order to dissolve the soap in the oil. After solution has occurred, 1.5 parts thereof and 98.5 parts of asphalt were added, the mixture heated and agitated in order to form a smooth and uniform liquid.

Example II

An alkali metal oleate was prepared by mixing oleic acid and a solution of an alkali or an alkaline salt of an alkali metal, such as the hydroxide, carbonate, bicarbonate, phosphate, silicate, etc., the product diluted and heated to boiling, and this product added to a hot solution of aluminum sulfate, stirring vigorously. A curdy precipitate of aluminum oleate forms, which is then squeezed to remove excess water.

To this aluminum soap one-half its weight of oleic acid and 1.5 of light lubricating oil is added and asphalt, 98.5 per cent, and this mixture, 1.5 per cent, are mixed.

Example III

A hot, aqueous solution of sodium naphthenate was added to a boiling solution of aluminum sulfate and the excess water squeezed from the aluminum naphthenate which resulted. This curd was then dissolved in twice its weight of light lubricating oil and 50 per cent of red oil added, and the product mixed with asphalt in the above proportions.

Example IV

The aluminum salt of sulfated naphthalene was prepared by mixing, at room temperature, a solution of aluminum sulfate with a solution of a sodium salt of sulfated naphthalene. The resulting curd was freed from the excess of water, dissolved in twice its weight of light lubricating oil, this mixture commingled with asphalt in the above proportions and 1.5 red oil added to the asphalt mixture.

Example V

A mass of asphalt was melted and 1.5 per cent of commercial aluminum stearate and 1.5 per cent of red oil added and the mixture stirred until the aluminum stearate was completely dissolved. No lubricating oil or bitumen was added.

The product of the above examples has a ductility of 30 to 40 per cent greater than the asphalt used and, of more practical importance, its wetting power is very high. When the product is applied on wet surfaces, it will displace the film of water from those surfaces and give perfect wetting and adhesion.

In preparing material for construction or repair of pavements, the modified asphalt may be mixed with the aggregate and the mass placed in position and rolled or tamped down, or the aggregate may be placed in the mixer and the soap mixture added and mixed in it, then the asphalt added. It will instantly mingle with the aggregate and thoroughly wet it.

If the asphalt is "cut back" the operation is performed in the cold, but if it is not, the material needs to be heated sufficiently to melt the asphalt.

Broken stone or other aggregate may be spread on the pavement, or in original construction, on the road bed, rolled down and the asphalt mixture sprayed over it, after which another rolling completes the construction.

When making the lines on pavement usually used to guide travel, the soap mixture may be painted in place, and molten or "cut back" asphalt painted over it. The asphalt will adhere perfectly.

Similarly, in painting with asphalt, the soap composition may be painted or sprayed on the surface, and hot or "cut back" asphalt added. Under these conditions, the asphalt will also adhere perfectly.

Instead of the aluminum soap any water insoluble soap may be used. For instance the oleates of copper, iron, lead, zinc and of the alkaline earths may be used, but this list is not to be taken as limiting, but only in an illustrative sense.

So the invention is not limited to the use of oleates but any other fatty acid having more than 12 carbon atoms in its molecule may be used.

Since certain changes in carrying out the above process, and certain modifications in the article which embody the invention may be made without departing from the scope, it is intended that all matter contained in the above description shall be interpreted as illustrative and not in a limiting sense.

It is also to be understood that the following claims are intended to cover all the generic and specific features of the invention which as a matter of language might be said to fall therebetween; and that they are intended to be inclusive in scope and not exclusive, in that if desired other materials may be added to my novel composition of matter herein claimed without departing from the spirit of my invention.

Particularly it is to be understood that in said claims ingredients or components recited in the singular are intended to include compatible mixtures of said ingredients wherever the sense permits.

I claim:

1. The method of preparing a bituminous paving material which comprises segregating a mass of paving aggregate, adding thereto a mixture of aluminum oleate, free oleic acid and light lubricating oil, in sufficient amount to thoroughly coat the particles of aggregate therewith, while maintaining the mass in agitation, and, when the soap mixture is uniformly distributed, adding the amount of bituminous material required for the pavement and continuing the agitation until said bituminous material is evenly distributed over and around the particles of aggregate.

2. A paving composition comprising an aggregate, the particles of which are coated by a mixture of aluminium oleate, oleic acid and light lubricating oil, the whole thoroughly commingled with bituminous material in sufficient amount to coat the so prepared particles of aggregate and to fill any voids existing between them.

3. A composition of matter which comprises an aluminum soap, free oleic acid, light lubricating oil, and bituminous material, thoroughly and smoothly mingled together.

4. The method of preparing a paving material which comprises thoroughly commingling an aluminum soap, free oleic acid, and bituminous material, heating said material to a temperature at which it is in the liquid state, and mixing this composition with a suitable amount of paving aggregate.

JAMES M. JOHNSON.